(12) United States Patent
Hecht (10) Patent No.: US 12,121,977 B2
(45) Date of Patent: Oct. 22, 2024

(54) HIGH-FEED TURNING TOOL ASSEMBLY

(71) Applicant: ISCAR, LTD., Tefen (IL)

(72) Inventor: Gil Hecht, Nahariya (IL)

(73) Assignee: ISCAR, LTD., Tefen (IL)

( * ) Notice: Subject to any disclaimer, the term of this patent is extended or adjusted under 35 U.S.C. 154(b) by 526 days.

(21) Appl. No.: 17/493,713

(22) Filed: Oct. 4, 2021

(65) Prior Publication Data

US 2022/0023955 A1 Jan. 27, 2022

Related U.S. Application Data

(63) Continuation of application No. PCT/IL2020/050510, filed on May 12, 2020.

(60) Provisional application No. 62/850,189, filed on May 20, 2019.

(51) Int. Cl.
B23B 27/16 (2006.01)

(52) U.S. Cl.
CPC .................. B23B 27/16 (2013.01)

(58) Field of Classification Search
CPC ..... B23B 27/145; B23B 27/141; B23B 27/16; B23B 27/1603; B23B 27/1611; B23B 27/1614; B23B 27/1622; B23B 29/043; B23B 29/04; B23B 2205/12; B23B 2200/165; B23B 2200/204; B23B 5/12; B23B 2220/40; B23B 2210/04; B23B 2200/3618

See application file for complete search history.

(56) References Cited

U.S. PATENT DOCUMENTS

| 10,086,435 B2 | 10/2018 | Sung et al. |
| 2006/0147281 A1 | 7/2006 | Nagaya et al. |
| 2006/0216121 A1* | 9/2006 | Edler ................. B23B 27/1611 407/104 |
| 2008/0193233 A1* | 8/2008 | Park ..................... B23C 5/2208 407/104 |
| 2013/0279997 A1 | 10/2013 | Hecht |
| 2014/0227051 A1 | 8/2014 | Hecht et al. |

OTHER PUBLICATIONS

International Search Report issued Aug. 20, 2020, in PCT/IL2020/050510.
Written Opinion issued Aug. 20, 2020, in PCT/IL2020/050510.

\* cited by examiner

*Primary Examiner* — Alan Snyder
(74) *Attorney, Agent, or Firm* — Womble Bond Dickinson (US) LLP (57) ABSTRACT

A two-directional high-feed turning tool assembly includes a tool holder, a cutting insert and a clamping element securing the cutting insert to the tool holder. The cutting insert includes an active cutting edge having a centrally located forwardmost edge portion and first and second main edge portions extending rearwardly from the forwardmost edge portion, as well as sideways to an extent further than flank tool sides of the tool holder. The first and second main edge portions also can each have a relatively small immersion angle facilitating high-feed turning in two sideways directions.

26 Claims, 7 Drawing Sheets

FIG.6C

HIGH-FEED TURNING TOOL ASSEMBLY

RELATED APPLICATIONS

This is a Bypass Continuation of International Patent Application No. PCT/IL2020/050510, filed May 12, 2020 and published as WO 2020/234866A1 on Nov. 26, 2020. Priority is claimed to U.S. Provisional Patent Application No. 62/850,189 filed May 20, 2019. The contents of the aforementioned applications are incorporated by reference in their entirety.

FIELD OF THE INVENTION

The subject matter of the present application relates to so-called high-feed turning inserts, turning tool holders and turning tool assemblies comprising same (which hereinafter may be called "insert", "tool holder" and "tool assembly", for succinctness).

BACKGROUND OF THE INVENTION

So-called high-feed turning inserts, tool holders and tool assemblies (a tool assembly being the insert, tool holder and a clamp element, e.g. screw or clamp, for holding the insert to the tool holder), are special purpose tools designed a particular machining operation, namely high-feed.

Generally speaking, the concept of high-feed turning machining is to remove relatively small chips of metal or like material from a rotating work-piece relatively rapidly, rather that removing relatively larger chips at a slower rate.

A known example of a high-feed (therein called "high-efficiency cutting" or "rapid feed cutting") turning tool assembly is shown in FIG. 8 of U.S. Pat. No. 10,086,435.

Notably, in FIG. 8 a relatively small so-called "immersion angle λ4". In milling high-feed publications a comparative angle is commonly denoted as angle "k" and will be denoted as such in this application. Reverting to said publication, immersion angle λ4 is stated to be in the range from 15° to 30°. Stated differently, in said publication, the length l of the major cutting edge 124 is significantly longer (in the language used "twice as much or more") than the depth d. This allows the so-called rapid feed cutting, since the smaller chip machined applies smaller cutting forces on the tool holder.

While the present application is not intended to be constrictively limited by the specific angles and definitions in U.S. Pat. No. 10,086,435, said publication can aid understanding to the type of machining operation addressed in the present application, namely high-feed turning. In the present application, quantitatively, "high-feed" can be considered to include machining conditions including both a feed rate (F) fulfilling the condition: 0.8≤F≤3.5 mm/rev, preferably 1.5≤F≤3.0, and a cutting depth ($a_p$) fulfilling the condition: 0.3≤$a_p$≤3.0 mm, preferably 0.5≤$a_p$≤2.0 mm (for example at a cutting velocity (V) of about 150 m/min). Immersion angle "k" typically fulfills the condition of about 6°≤k≤30°, preferably 12°≤k≤20°.

SUMMARY OF THE INVENTION

In accordance with a first aspect of the subject matter of the present application, there is generally provided a two-directional high-feed turning tool assembly comprising: a tool holder and an insert secured thereto with a clamping element. The insert comprises an active cutting edge (i.e. the cutting insert comprising one active cutting edge for each indexable position of the cutting insert) that extends sideways further than both sides of the front end of the tool holder, at least where the machining takes place (i.e. the head portion of the tool holder) and the active cutting edge has one main cutting edge portion configured to machine in one sideways direction and another main cutting edge portion designed to machine in the opposite sideways direction (in other words, the cutting edge is not relieved on one side as per the design of cutting edges designed to work in one direction) thereby configuring the tool assembly to rapidly machine in not only one sideways direction but both sideways directions during a single machining operation, providing a significant advantage over the known prior art.

To differentiate with respect to FIG. 8 of U.S. Pat. No. 10,086,435, while the cutting edge appears symmetrical in the top view shown, from the various angles described with reference to both FIGS. 7 and 8, and in view of the above said flank wall, it is understood that the cutting edge is relieved. This understanding is supported by the large flank wall which indicates the tool assembly shown was only intended for high-feed turning in one sideways direction, since at any small depth the tool holder will be restricted in one sideways direction by the flank wall and an external object (e.g. a side wall of a workpiece that is no longer cylindrical, or a portion of a machining station). In other words, the tool assembly is unable to groove (remove material while moving in the forward direction) to a significant depth past the front cutting edge thereof or machine a workpiece adjacent to where said flank side is adjacent to the front tool end.

The size of the flank wall of said publication and positioned adjacent to the insert pocket assists in understanding the strength needed to securely hold the cutting insert during machining at high-feed in even only a single direction, due to the expected high machining forces.

Reverting to a more particular description of features of the present aspect, the two-directional high-feed turning tool assembly can comprise: a tool holder, a cutting insert, and a clamping element; the tool holder comprising: opposite front and rear tool ends defining a longitudinal direction including a forward direction towards the front tool end and a rearward direction opposite thereto; opposite upper and lower tool sides defining a vertical direction including an upward direction towards the upper tool side and a downward direction opposite thereto; opposite first and second flank tool sides defining a sideways direction including a first side direction towards the first flank tool side and a second side direction opposite thereto; a vertical bisector plane extending parallel to the longitudinal and vertical directions, and bisecting the first and second flank tool sides adjacent to the front tool end; a shank portion; a head portion extending from the shank portion; and an insert pocket formed at an intersection of the front tool end and upper tool side of the head portion, the insert pocket comprising a pocket base surface; the cutting insert is secured to the insert pocket via the clamping element; the cutting insert comprising: opposite top and bottom surfaces, and an insert flank surface connecting the top and bottom surfaces; and a peripheral cutting edge formed along at least a portion of an intersection of the insert flank surface and the top surface, the peripheral cutting edge comprising at least one active cutting edge; the active cutting edge comprising: a forwardmost edge portion located forward of the front tool end, extending further in the forward direction than the remainder of the active cutting edge, and having a lateral edge length measurable parallel to the sideways direction; a first main edge portion extending from the forwardmost edge in both the first side and rearward directions to a location further in the first side direction than the first flank tool side adjacent the front tool end, the first main edge portion having a first edge length measurable parallel to the sideways direction and a first edge depth measurable parallel to the longitudinal direction; a second main edge portion extending from the forwardmost edge in both the second side and rearward directions to a location further in the second side direction than the second flank tool side adjacent the front tool end, the second main edge portion having a second edge length measurable parallel to the sideways direction and a second edge depth measurable parallel to the longitudinal direction; the first edge length being larger than each of the first edge depth and the lateral edge length; and the second edge length being larger than each of the second edge depth and the lateral edge length.

While there may be other ways to clamp an insert, without the described restrictive side wall of the prior art, yet being able to carry out the high-feed two-directional machining operation described above, one preferred construction for achieving such high-feed operations is described below.

Specifically, according to a second aspect of the present invention, it has been conceived to provide an asymmetric clamping configuration for machining in the two opposite directions. While this is somewhat counterintuitive, as one would think for two opposite directions a symmetric clamping arrangement would be advantageous, it is difficult to manufacture a cutting insert and tool holder, which are rigid elements, and which can simultaneously contact more than three lateral abutment surfaces, and four lateral abutment surfaces are believed needed for symmetrical abutment (notably this statement is directed lateral or sideways abutment, i.e. not including vertical abutment of, say, an bottom insert surface and pocket base surface abutment). Without being bound to theory, it is possible that the above-said difficulty is one of the reasons that high-feed machining in two directions is hitherto unknown.

More precisely, the two-directional high-feed turning tool assembly can comprise: a tool holder, a cutting insert and a clamping element; the tool holder comprising: opposite front and rear tool ends defining a longitudinal direction including a forward direction towards the front tool end and a rearward direction opposite thereto; opposite upper and lower tool sides defining a vertical direction including an upward direction towards the upper tool side and a downward direction opposite thereto; opposite first and second flank tool sides defining a sideways direction including a first side direction towards the first flank tool side and a second side direction opposite thereto; a vertical bisector plane extending parallel to the longitudinal and vertical directions, and bisecting the first and second flank tool sides adjacent to the front tool end; a shank portion; a head portion extending from the shank portion; and an insert pocket formed at an intersection of the front tool end and upper tool side of the head portion, the cutting insert is secured to the insert pocket via the clamping element; the cutting insert comprising: opposite top and bottom surfaces, and an insert flank surface connecting the top and bottom surfaces; and a peripheral cutting edge formed along at least a portion of an intersection of the insert flank surface and the top surface; the insert flank surface comprising: a first insert flank sub-surface which faces both the rearward and second flank tool side directions; and a second insert flank sub-surface which faces both the rearward and first flank tool side directions; the bottom surface comprising: a flank insert abutment surface which faces the first flank tool side direction; the insert pocket comprising: a pocket base surface, a first pocket abutment wall extending upwardly from the pocket base surface and which faces both the forward and second flank tool side directions; and a second pocket abutment wall extending upwardly from the pocket base surface and which faces both the forward and first flank tool side directions; the pocket base surface comprising: a flank pocket abutment surface located closer than the first and second pocket abutment walls to the front tool end and which faces the second flank tool side direction; wherein the only abutment locations of the insert and insert pocket are: the first insert flank sub-surface abuts the second pocket abutment wall; the second insert flank sub-surface abuts the first pocket abutment wall; the flank insert abutment surface abuts the flank pocket abutment surface; and the bottom surface abuts the pocket base surface.

For the sake of simplicity, for example, the flank insert abutment surface is defined above to face the first flank tool side direction and the flank pocket abutment surface which it is intended to abut is defined to face the second flank tool side direction. It will be understood that these directions can be reversed and that the particular direction chosen is merely for succinctness (since "first" or "second" could be either sideways direction).

To elaborate on the asymmetric abutment above, while the pocket and insert both have two surfaces facing each of the two directions, at the more forward part of the insert pocket, the flank pocket abutment surface and corresponding flank insert abutment surfaces only provide stability for one sideways direction, which would be seemingly lacking for machining in the opposite sideways direction.

It is of course envisioned that the novel double directional high-feed turning method of the present invention could be feasible without any flank insert abutment surface and flank pocket abutment surface (completely relying on, for example, the insert flank abutment and pocket abutment walls) or could rely on a second pair of flank insert abutment and flank pocket abutment surfaces facing the other sideways direction (providing symmetry but over-constraint due to four lateral connection surfaces). While with high precision grinding, such solutions are feasible, the construction above is believed highly advantageous due to simplified and far less precise manufacturing. Nonetheless, the inventive method of the present application and the first aspect should not be considered as limited to this independently inventive construction.

While the previous paragraph noted the flank insert abutment surface and flank pocket abutment surface are not, theoretically, essential, certainly they assist in providing stable mounting of the insert while still allowing machining for said two opposite directions (without impeding with a side abutment wall adjacent a front end of the tool). This being of particular importance for high-feed operations which incur relatively high forces compared to other machining operations such as, e.g., finish operations. It will be understood that high-feed operations, or constructions suitable therefor, are roughing operations designed to rapidly remove material.

Due to the added stability, while allowing machining in two directions, it will be understood that said mounting arrangement of the second aspect may even be useful for providing such advantages for different insert shapes or cutting edges designed for applications other than high-feed machining. Accordingly, the second aspect should not be viewed as only confined to a particular cutting edge configuration.

Nonetheless, this mounting arrangement is clearly particularly advantageous with a cutting edge designed for high-feed machining, as described in connection with the first aspect.

Similarly, while it has been noted that the first aspect and noted method could be achieved with different constructions, clearly the mounting arrangement features (abutment surfaces etc.) defined in the second aspect is preferred.

According to a third aspect of the present invention, there is provided a tool holder as described in either the first or second aspect.

According to a fourth aspect of the present invention, there is provided an insert as described in either the first or second aspect.

For example, according to some embodiments, said insert comprises: opposite top and bottom surfaces, and an insert flank surface connecting the top and bottom surfaces; and a peripheral cutting edge formed along at least a portion of an intersection of the insert flank surface and the top surface; the cutting edge comprising an active cutting edge in turn comprising: a forwardmost edge portion having a lateral edge length measurable parallel to a sideways direction; a first main edge portion extending from the forwardmost edge in both first side and rearward directions and having a first edge length measurable parallel to the sideways direction and a first edge depth measurable parallel to a longitudinal direction perpendicular to the sideways direction; a second main edge portion extending from the forwardmost edge in both the second side and rearward directions and having a second edge length measurable parallel to the sideways direction and a second edge depth measurable parallel to the longitudinal direction; the first edge length being larger than each of the first edge depth and lateral edge length; and the second edge length being larger than each of the second edge depth and lateral edge length; each of the first and second main edge portions define first and second immersion angles K1, K2 fulfilling the condition: $6° \leq K1, K2 \leq 30°$; and at least the bottom surface comprise a flank insert abutment surface which is either provided on an internal recess or a protuberance; the flank insert abutment surface being closer to where the first main edge portion connects to the forwardmost end portion than any other portion of the cutting edge (i.e. in an indexable insert the cutting edge may have other forwardmost edge portions and first and second main edge portions, yet said flank insert abutment surface is closest to only one of them).

The preferred two-directional high-feed insert above preferably has the preferred features mentioned either in the second aspect or below.

According to a fifth aspect of the present invention, there is provided a method of machining in two opposite sideways directions as described above. It will be understood that such method can include providing a tool assembly according to either or both of the first and second aspects. Similarly, a tool holder or insert according to the previous aspects can be used with such method. Although, as stated above, machining in two sideways directions and/or close to a side surface or a workpiece or machine is hitherto unknown, either with the construction in the second aspect or with the high-feed construction in the first aspect. Accordingly, it should be noted that the method of machining may not be strictly limited to the features of either.

Said method can include the step of machining at high-feed conditions as defined above, namely including both a feed rate (F) fulfilling the condition: $0.8 \leq F \leq 3.5$ mm/rev, preferably $1.5 \leq F \leq 3.0$, and a cutting depth ($a_p$) fulfilling the condition: $0.3 \leq a_p \leq 3.0$ mm, preferably $0.5 \leq a_p \leq 2.0$ mm (for example at a cutting velocity (V) of about 150 m/min).

More particularly, said method can include the step of machining in one direction at the above high-feed condition and then the opposite direction at the same high-feed condition.

Even more particularly, said method can include machining adjacent to a side surface of a workpiece or machine holding the workpiece. Further, method can include machining adjacent to a side surface of a workpiece or machine holding the workpiece in either or both sideways directions.

Further such method can include the step of grooving (machining in the forward direction) further than a depth of half, or preferably all of the entire insert.

Some preferential features relating to the aspects are described below.

The first and second main edge portions can define first and second immersion angles K1, K2 relative to the sideways direction, fulfilling the condition: $6° \leq K1, K2 \leq 30°$, and preferably $12° \leq K1, K2 \leq 20°$. In some preferred embodiments the first and second immersion angles K1, K2 and the first and second immersion angles K1, K2 are equal in value.

The clamping element could be a lever, top-clamp or screw, as known in the art. Each known method of clamping having benefits as known.

The insert could theoretically be a single-sided or double-sided insert. In some embodiments a single-sided insert is preferred, even though a double-sided insert provides more cutting edges, since providing relief from the cutting edge due to the two directional machining operation is significantly simpler.

The insert is preferably indexable. Stated differently, the insert is indexable about a central insert axis extending through the center thereof. While a three-way indexable insert has been exemplified as a most preferred embodiment, it will be understood that even a non-indexable insert or an insert configured for more than three-way indexing is possible. Each design having benefits and disadvantages, with a three-way indexable insert having more cutting edges than non-indexable or two-way indexable inserts, yet longer cutting edges than inserts which have more than three-way indexability.

The forwardmost edge portion is preferably a wiper portion (i.e. straight in a top view of the insert, and typically having a length of about 1 mm). Nonetheless, since high-feed operations are roughing operations, it is feasible for the forwardmost portion to be, for example, a radius corner (i.e. leaving a surface with poorer finish, however possibly providing slightly longer main edges; the radius being preferably as close to a straight edge as possible). Alternatively, the forwardmost edge portion could have a concave shape in a top view of the insert.

It will be understood that the forwardmost edge portion itself is not merely a corner necessary for joining two functional main edge portions but provides a separation gap between the first and second main edge portions, i.e. which separates the usage of said edges when moving in different directions (i.e. theoretically reducing wear incurred when moving in one direction but wearing part of the oppositely located main edge). It is even feasible that the forwardmost edge portion be, for example, an inward concave edge, rather than the straight edge shown, since this would also provide such separation gap between the first and second main edge portions.

The first and second main edges are preferably straight in a top view thereof. However, it is known that in feed applications such edges can also be slightly curved in a top view thereof. It will be understood that the first and second main edges are both longer than the forwardmost edge since they provide the main cutting function in a high-feed operation. For example, each of the first and second main edges (separately) is preferably at least twice the length of the forwardmost edge, preferably at least three times the length thereof.

While it is highly preferred that the first and second main edge portions be symmetrical in angle, since this will maintain a similar tool life for both when operating in both directions, it is possible that they may have a slight non-symmetry.

It is preferred that the first and second main edge portions be equal in length, since this will maintain a similar tool life for both when operating in both directions.

An active cutting edge can be defined as a portion of the cutting edge extending forward of the front tool end.

It is preferred that the first and second main edge portions extend to a location further in the side directions than the flank tool side adjacent the front tool end. It will be understood that this allows grooving operation (i.e. machining in the forward direction further than the front tool end, since the flank tool sides thereof are of shorter width than the first and second main edge portions in a top view).

Additionally, said preferred shorter width of the tool's head portion, at least adjacent to the insert pocket allows said unimpeded machining in the sideways direction. Stated in more simple language, a width of the active cutting edge of the insert measured in the sideways direction is wider than a corresponding width of the head portion adjacent the tool's front end. Alternatively stated, a circumscribing circle of the insert's cutting edge (or intersection of the top surface and flank surface, if the cutting edge does not extend continuously therealong) in a top view of the insert, can have a diameter greater than a maximum width of the tool head portion at the front end. Alternatively stated, said diameter can be greater than a maximum width of the insert pocket.

Since the preferred embodiments are tool holders with head portions for turning and not parting off, they have more significant width and can withstand forces, and hence can be longer than the length of the insert pocket. As shown in the preferred examples below, said head portion, at least the head portion adjacent the front end, can be thinner (hereinafter "thin portion") than the width of the insert (measured via the maximum extension of the first and second main edges in the sideways direction) for a length measured in the longitudinal direction at least as long as the insert pocket measured parallel thereto. Preferably the thin portion of the head portion can extend in the longitudinal direction a length at least twice as long as an insert pocket length. More precisely, the first main edge portion and said second main edge portion can extend further in the respective first and second side directions than the first and second flank tool sides defining a thin portion of the head portion; and a thin portion extends for a length measured in the longitudinal direction at least as long as a longitudinal insert pocket length of the insert pocket which is measured parallel to the longitudinal direction, preferably the thin portion of the head portion extends in the longitudinal direction a length at least twice as long as the longitudinal insert pocket length.

Each of the first and second main edge portions should preferably extend a greater length in the sideways direction than in the longitudinal direction. It will be understood that high-feed operations without such feature are difficult since the forces caused by the machining are increased. This can alternatively be explained with reference to immersion angle k, specifically the preferred angles of which are described above. In some prior art tool assemblies having similar tool holders, circular edge inserts are shown with pins provided to facilitate indexing. It will be understood that the present application relates to high-feed operations which are not suitable with such circular edges for the above-stated reason. Stated differently, as the main edge portions recedes rearwardly of a circumscribing circle of the cutting edge, when viewed in a top view. Similarly, the pins are merely for positioning and not known to be for withstanding machining force.

Preferably there is an identical chip-former arrangement formed along each of the first and second main edge portions, since they both provide similar functions. For indexable inserts it is preferred that this same chip-former arrangement be formed along the entire cutting edge.

Preferably, the insert pocket further comprises: a pocket base surface, a first pocket abutment wall extending upwardly from the pocket base surface and which faces both the forward and second flank tool side directions; and a second pocket abutment wall extending upwardly from the pocket base surface and which faces both the forward and first flank tool side directions.

Preferably, the insert bottom surface and the pocket base surface are flat. While some tool assembly designs have prismatic/ridge connections between the insert bottom surface and the pocket base surface to prevent lateral motion, it is preferred for high-forces in high-feed applications that the insert be more stable which is achieved with a majority of the abutment thereof (i.e. the abutment of the insert bottom surface and the pocket base surface) being flat. While it is disadvantageous that said flank insert abutment and flank pocket abutment surfaces detract from this stable abutment, they are considered an advantageous feature for lateral abutment and accordingly a compromise is made. Nonetheless, it is certainly preferred that the vertical abutment be via flat surface abutment.

Similarly, it is preferred that the insert flank surfaces be used for abutment, even though it is possible for such abutment to be made, for example, on surfaces adjacent to the insert bottom surface (e.g. internal recesses). Again, this preference is due to the relatively high-forces mentioned and the assumption that the insert flank surfaces will generally be larger than the alternatives of surfaces adjacent the insert bottom surface or internal recesses.

Nonetheless, to enable the desired two-directional machining capability, and without lateral restrictions, the present design does provide the insert with one side abutment surface adjacent to the insert bottom surface, namely the insert flank surface, and, of course, a complimentary flank pocket abutment surface.

According to some embodiments, the cutting insert further comprises a flank insert abutment surface adjacent to the insert bottom surface and the pocket base surface further comprises a flank pocket abutment surface; and the flank insert abutment surface abuts the flank pocket abutment surface.

Advantageously, the flank insert abutment surface is provided on an internal recess in the insert bottom surface. In such case the flank pocket abutment surface is provided on a protuberance formed on a pocket base surface. Even though the flank insert abutment surface could be provided, for example, on an external surface of a projecting portion of the insert, i.e. a protuberance (and in such case the flank pocket abutment surface would be provided on a recess in the pocket base surface), which would be easier to grind, the internal recess design on a cutting insert is preferred as it allows the insert to be more compact, and said preferred insert can avoid being ground (at least for this particular surface, i.e. the insert bottom surface).

Another advantage is that a non-central protuberance formed on the insert would be disadvantageous for pocket base surface production, requiring multiple insert base recesses for indexable inserts. While the latter reason would not be applicable to a centrally located protuberance, having a non-centrally located insert flank surface (i.e. an insert flank surface proximate to the tool front end or to the active cutting edge) provides greater stability for the insert. Stated differently, it is preferred that the flank insert abutment surface is closer to the active cutting edge than to a center of the insert.

For the same reasons as above, it is preferred that flank pocket abutment surface is preferably formed on a projecting portion, i.e. a protuberance.

The flank insert abutment surface is preferably the closest abutment surface of the insert to an active cutting edge. Stated with respect to a tool assembly, the flank insert abutment surface is preferably the closest abutment surface to the tool front end. It should be understood that all such features of closer and further abutment surfaces throughout the description and claims are not intended to include the insert bottom surface and pocket base surface.

Due to consideration of high-forces, both the insert flank and flank pocket abutment surfaces are flat, at least where the desired contact is. It will be understood that abutment of two flat surfaces are preferred over a single-point contact area. Certainly, in the case of machining high-feed operations with relatively high forces.

To ensure contact of only the pocket flank abutment surface and not the surface located on the opposite side of the vertical plane. The protuberance can preferably extend further in one of the first or second sideways directions than in the other of the first and second sideways directions. Stated differently, the protuberance can be asymmetric about the vertical plane $P_V$. Such construction allows the recesses in the insert to be made completely symmetrically. Alternatively, each recess in the insert's bottom surface could be slightly shorter on one side and the protuberance could be made symmetric about the vertical plane $P_V$ as long as the insert is rotationally symmetric for each recess. Stated differently, each recess in the insert's bottom surface is shorter on one side in one of the first or second sideways directions.

Since the purpose of the flank insert abutment surface is to stabilize the insert near the cutting edge thereof, it is preferably close to the cutting edge intended for operation. Stated differently, the flank insert abutment surface is preferably closer than the insert flank surface being used for rear abutment to the insert pocket, to the active cutting edge. Stated differently, the flank insert abutment surface is preferably between the insert's central axis and the active cutting edge.

In all preferred embodiments the insert flank surface abuts both the first and second pocket abutment walls. To elaborate a first insert flank sub-surface abuts the first pocket abutment wall and a second insert flank sub-surface abuts the second pocket abutment wall.

The abutment locations are preferably asymmetric to allow three-point contact while still allowing machining in opposite directions. Stated differently, in a top view of the insert pocket, the first pocket abutment wall and the second pocket abutment wall, where they abut the cutting insert, are asymmetric relative to the vertical bisector plane.

It is preferred that a first abutment location (e.g. the first insert flank sub-surface and first pocket abutment wall) be further from the tool holder front end than a second abutment location (e.g. the second insert flank sub-surface and second pocket abutment wall).

More precisely, it is preferred that above mentioned second abutment location (the one closer to the tool holder front end, is the same side of the tool holder as the third abutment location, i.e. the flank insert abutment surface abutting the flank pocket abutment surface.

Stated differently, the insert can comprises a flank insert abutment surface adjacent to the insert bottom surface and the insert pocket further comprises a pocket base surface; and the flank insert abutment surface abuts the flank pocket abutment surface; wherein the flank insert abutment surface abuts the flank pocket abutment surface closer, in the longitudinal direction, to the front tool end than abutment of the cutting insert to the first pocket abutment wall and to the second pocket abutment wall.

Abutment of the first pocket abutment wall to the cutting insert can preferably be further, in the longitudinal direction, from the front tool end, than where the first insert flank sub-surface abuts the second pocket abutment wall. In such case it is preferable that the flank pocket abutment surface and the second pocket abutment wall are on the same side of the vertical bisector plane and the first pocket abutment wall is on the other side of the vertical bisector plane.

While the examples above define the preferred arrangement (where the insert pocket is asymmetric) it should be understood that asymmetric abutment is desired and hence an alternative to all abutment surfaces will be exemplified below. In summary the asymmetric abutment design can be provided in different ways.

Notably, both ways exemplified only provide the insert being abutted on one side adjacent to the tool front end (i.e. there is not more than one abutment location on said protuberance on the insert pocket base surface). This is to ensure the unground insert (or lesser ground, noting the cutting edge or bottom surface may be ground, but no grinding may be needed for lateral abutment surfaces) is not over-constrained and can properly abut both pocket abutment walls.

In one preferred example shown, a non-circular screw hole surface is used to allow a screw to direct a clamping force towards a particular insert flank surface location.

Preferably, the insert flank surface further comprises: a first insert flank sub-surface which faces both the rearward and second flank tool side directions; and a second insert flank sub-surface which faces both the rearward and first flank tool side directions; the insert's bottom surface further comprises: a flank insert abutment surface which faces the second flank tool side direction; the insert pocket further comprises: a pocket base surface, a first pocket abutment wall extending upwardly from the pocket base surface and which faces both the forward and first flank tool side directions; and a second pocket abutment wall extending upwardly from the pocket base surface and which faces both the forward and second flank tool side directions; the pocket base surface comprising: a flank pocket abutment surface located closer than the first and second pocket abutment walls to the front tool end and which faces the first flank tool side direction; wherein the only abutment locations of the insert and insert pocket are: the first insert flank sub-surface abuts the first pocket abutment wall; the second insert flank sub-surface abuts the second pocket abutment wall; the flank insert abutment surface abuts the flank pocket abutment surface; and the bottom surface abuts the pocket base surface.

In the other preferred example shown, an asymmetric abutment is merely provided with a standard screw hole, but by relieving the pocket abutment walls to ensure a symmetrical insert flank sub-surfaces contact the pocket abutment walls at different distances from the tool holder front end.

An alternative or additional feature which could apply to either example described above, could be that the pocket abutment walls extend asymmetrically (in a top view) at least at the portions thereof which are intended for abutment, to ensure abutment locations at different distances from the tool holder front end.

Preferably the forwardmost edge portion intersects the vertical bisector plane. Such symmetry being advantageous in two-directional machining.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Referring to FIGS. 1A to 1D, illustrated is a high-feed tool assembly 10 comprising a three-way indexable insert 12, a tool holder 14 and a screw 16 securing the insert 12 to the tool holder 14.

Figure 2A:
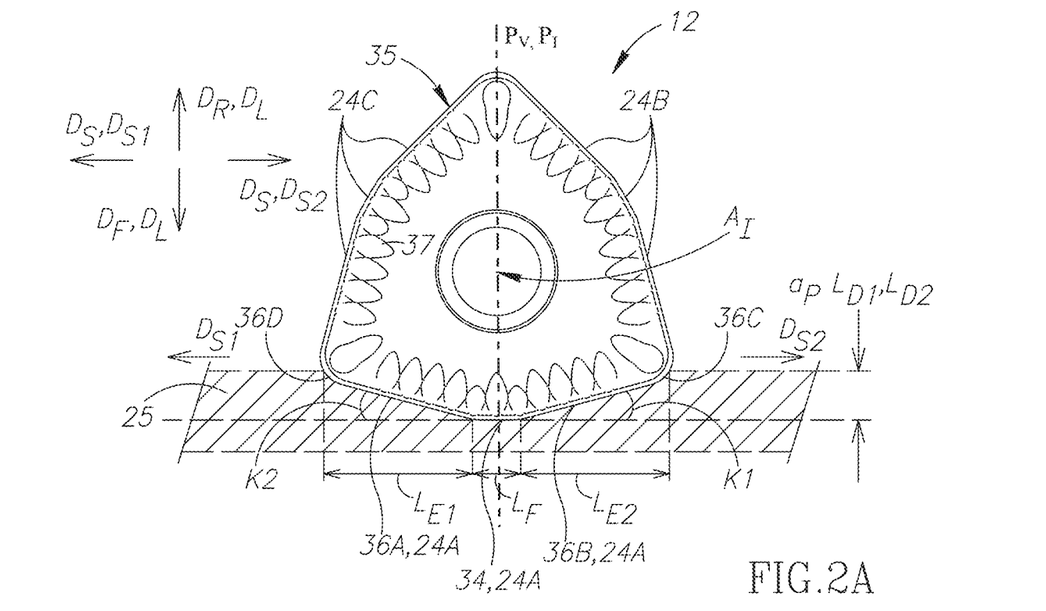
FIG. 2A is a top view of the insert in FIG. 1A with a schematic portion of a workpiece shown.
Figure 2B:
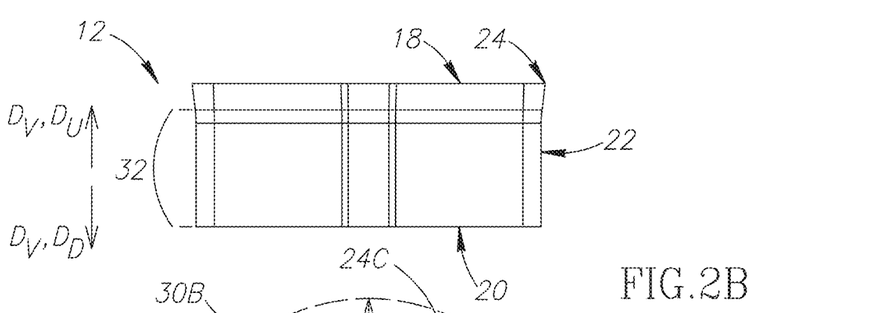
FIG. 2B is a side view of the insert in FIG. 2A.
Figure 2C:
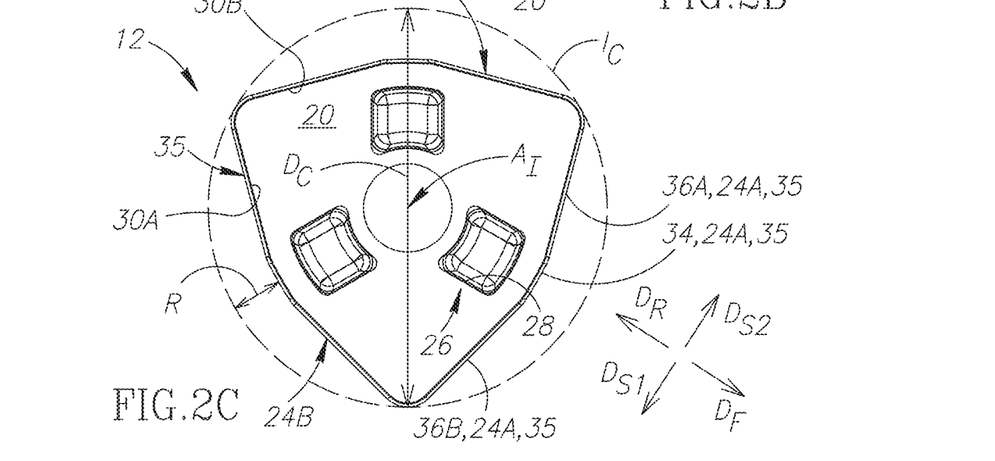
FIG. 2C is a bottom view of the insert in FIG. 2A.

To describe the cutting insert 12 in more detail, attention is drawn to FIGS. 2A to 2C.

The insert 12 comprises opposite top and bottom surfaces 18, 20 and an insert flank surface 22 connecting the top and bottom surfaces 18, 20.

The insert 12 further comprises a peripheral cutting edge 35 formed at an intersection of the top surface 18 and the insert flank surface 22. The peripheral cutting edge 35 comprises first, second and third active cutting edges 24A, 24B, 24C. Each of the first second and third active cutting edges 24A, 24B, 24C is formed on a different side of the three-way indexable insert 12 (i.e. a different one of the active cutting edges is presented when the cutting insert 12 is rotated 120 degrees about a centrally located insert axis $A_I$).

As seen in FIG. 2A, the first active cutting edge 24A, comprises a forwardmost edge portion 34, a first main edge portion 36A, and a second main edge portion 36B. Each "active cutting edge" is called so because it is the portion of the peripheral cutting edge 35 which is active in machining a workpiece 35 when mounted to the tool holder 14. After the cutting insert 12 is indexed a different active cutting edge is active. As seen in FIG. 2A the first active cutting edge 24A participates in cutting the workpiece 25. The cutting insert has an insert vertical plane $P_I$ which passes through the insert's top and bottom surfaces, contains the central insert axis $A_I$ and intersects the forwardmost edge portion 34.

Since all three sides of the insert are rotationally identical, the description will only relate to one of the three symmetric sets of features.

While the first active cutting edge 24A is shown at the bottom of FIG. 2A, for describing abutment or mounting of the insert 12, for ease of explanation the first active cutting edge 24A is located at the right-side of the bottom view in FIG. 2C.

The bottom surface 20 comprises an internal recess 26 which in turn comprises a flat flank insert abutment surface 28 at one side thereof and which faces the second sideways direction $D_{S2}$.

When mounted to the tool holder 14, as described below, the flank insert abutment surface 28 provides abutment relative to a distally located first insert flank sub-surface 30A and second insert flank sub-surface 30B.

The insert 12 is a positive insert with the lower portion 32 thereof relieved inwardly relative to the peripheral cutting edge 35, as shown in FIG. 2B.

As shown best in FIG. 2A, the forwardmost edge portion 34 has a lateral edge length $L_F$ measurable parallel to the sideways direction $D_S$. The forwardmost edge portion 34 is preferably straight in a top view of the insert 12.

The first main edge portion 36A extends from the forwardmost edge portion 34 in both the first side direction $D_{S1}$ and rearward direction $D_R$ and has a first edge length $L_{E1}$ and a first edge depth $L_{D1}$ (which in this case is identical to the value designated $a_p$).

The second main edge portion 36B extends from the forwardmost edge portion 34 in both the second side direction $D_{E2}$ and rearward direction $D_R$ and has a second edge length $L_{E2}$ and a second edge depth $L_{E2}$ (which in this case is identical to the value designated $a_p$).

As stated above, the first and second main edges 36A, 36B are preferably straight in a top view thereof (i.e. FIG. 2A). It is noted that these edges can even remove material until halfway through a radius corner 36C, 36D thereof as shown. The half radius corners 36C, 36D are included in the above-mentioned lengths. It will be understood that all of the three active cutting edges, i.e. the first, second and third active cutting edges 24A, 24B, 24C, meet at corners. Since the majority of the main edge portions are straight (except for a small inevitable corner portion), the main edge portions are considered straight.

As shown, each of the first and second main edge portions 36A, 36B extend a significantly greater length in the sideways direction $D_S$ than in the longitudinal direction $D_L$.

Accordingly, the first and second immersion angles K1, K2, which in this preferred embodiment are both 15°, which are relatively small angles.

This geometry is also relevant to the distance R, explained below.

Reverting to the description of the top surface 18 (also known as a "rake surface"), in the example shown, there is an identical chip-former arrangement 37 formed along the entire peripheral cutting edge 35.

Referring to FIG. 2C, even though usually an imaginary circumscribing circle $I_C$ of the peripheral cutting edge 35 located along an upper surface would typically be drawn on FIG. 2A, for ease of visibility it is shown in FIG. 2C. Since the exemplified insert 12 is a so-called positive insert, the peripheral cutting edge 35 is visible in the bottom view.

The insert's circumscribing circle $I_C$ allows calculation of a diameter Dc.

It will be understood that a similar sized circular insert would have a cutting edge matching the circumscribing circle $I_C$ shown in FIG. 2C, yet the high-feed cutting edge is recessed therefrom, for example as shown by distance R in FIG. 2C (with respect to a different active cutting edge than the one described so far as an example, but symmetric thereto).

Referring to FIG. 2C, the flank insert abutment surface 28 is closer to the first active cutting edge 24A than the first and second flank insert abutment sub-surfaces 30A, 30B. Alternatively stated, the flank insert abutment surface 28 is closer to the first active cutting edge 24A than the second and third active cutting edges 24B, 24C.

To describe the tool holder 14 in more detail, attention is drawn to FIGS. 1A-1D and 3A to 3D.

The tool holder 14 comprises opposite front and rear tool ends 38, 40 defining a longitudinal direction $D_L$ including a forward direction $D_F$ towards the front tool end 38 and a rearward direction $D_R$ opposite thereto; opposite upper and lower tool sides 42, 44 defining a vertical direction $D_V$ including an upward direction $D_U$ towards the upper tool side and a downward direction $D_D$ opposite thereto; and opposite first and second flank tool sides 46, 48 defining a sideways direction $D_S$ including a first side direction $D_{S1}$ towards the first flank tool side 46 and a second side direction $D_{S2}$ opposite thereto.

More specifically, the tool holder 14 comprises a shank portion 50 and a head portion 52 extending from the shank portion 50, and an insert pocket 54 formed at an intersection of the front tool end 38 and upper tool side 42 of the head portion 52.

A vertical bisector plane $P_V$ (FIG. 1A) extends parallel to the longitudinal $D_L$ and vertical directions $D_V$, and bisects the first and second flank tool sides 46, 48 adjacent to the front tool end 38. While in the example shown in FIG. 7A, the vertical bisector plane $P_V'$ incidentally also extends through the center of the shank portion 50', the significance of the vertical bisector plane $P_V$, for the purpose of defining features of the present invention, is only with respect to the tool head portion 52, and not the shank portion 50.

Figure 3A:
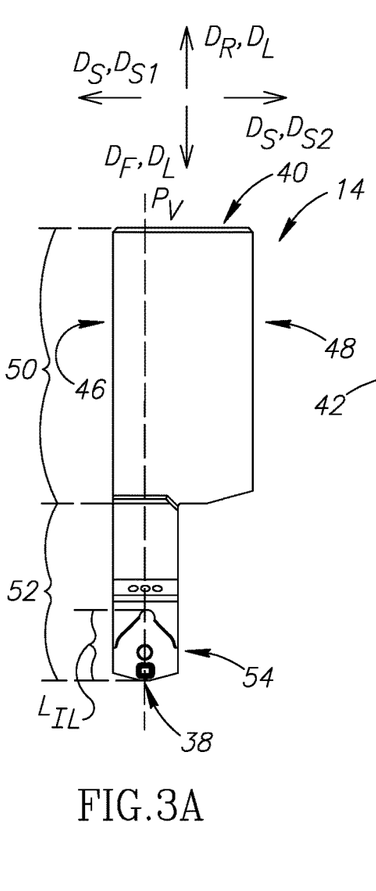
FIG. 3A is a top view of the tool holder in FIG. 1A.
Figure 3B:
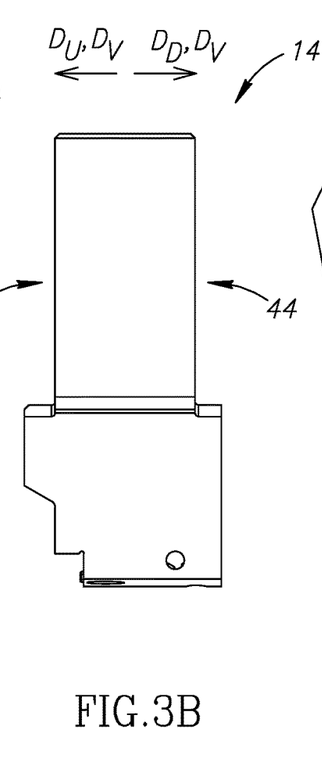
FIG. 3B is a side view of the tool holder in FIG. 3A.
Figure 3C:
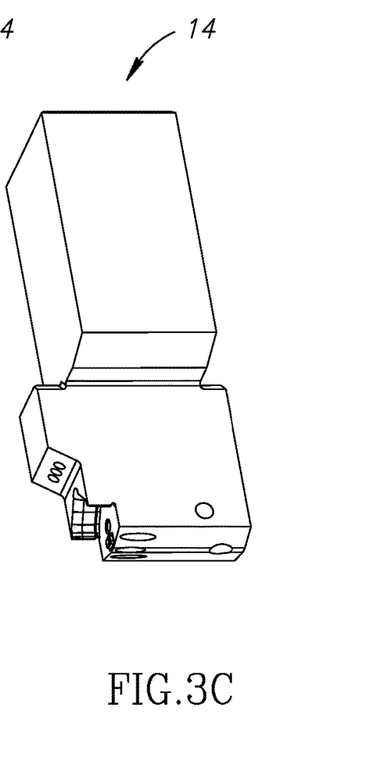
FIG. 3C is a perspective view of the tool holder in FIG. 3A.
Figure 3D:
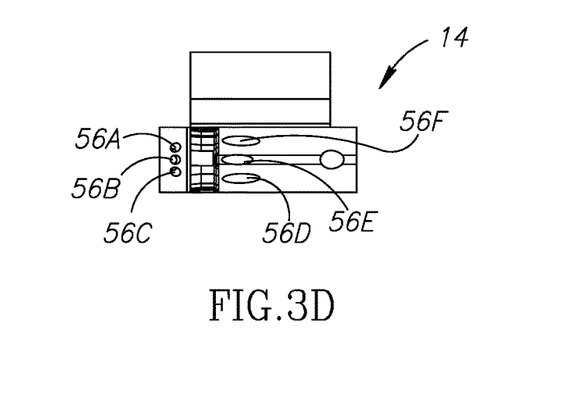
FIG. 3D is a front view of the tool holder in FIG. 3A.

The tool holder 12 can optionally comprise a coolant arrangement, which shows in this preferred example multiple coolant outlets 56A, 56B, 56C, 56D, 56E, 56F (designated in FIG. 3D).

Figures 1A, 1B:
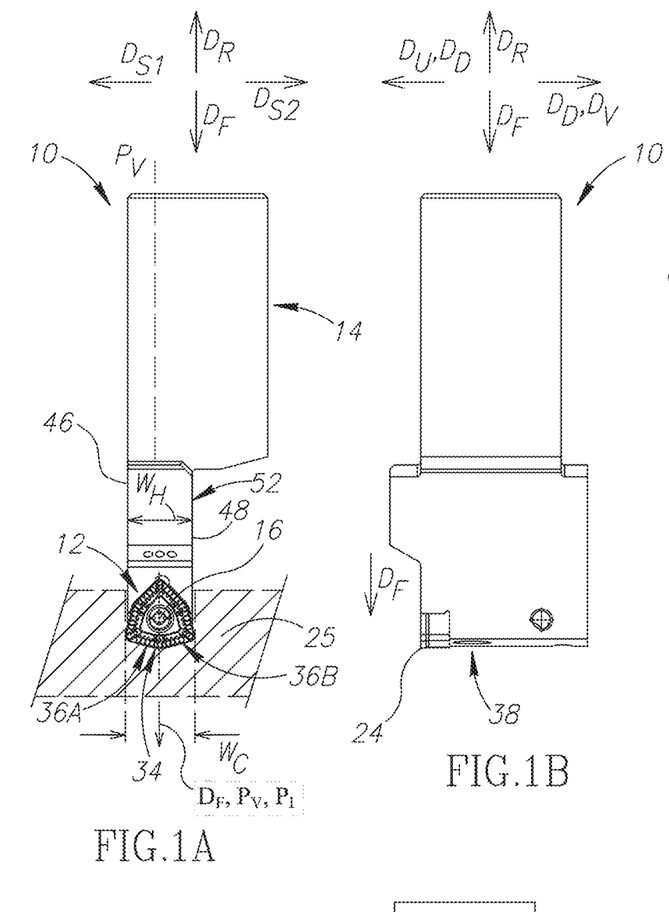
FIG. 1A is a top view of an example high-feed tool assembly according to the subject matter of the present application with a schematic portion of a workpiece shown.
FIG. 1B is a side view of the tool assembly in FIG. 1A.
Figure 1C:
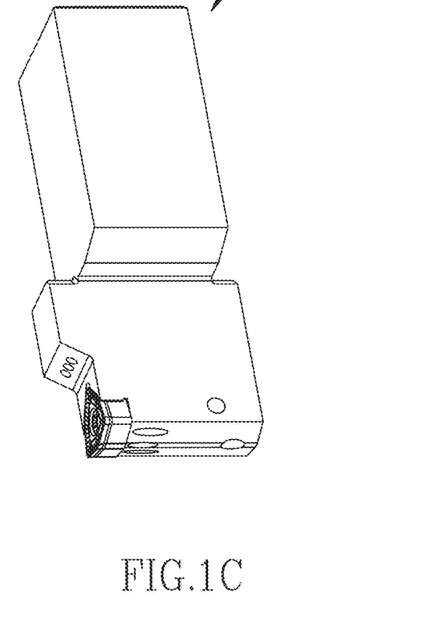
FIG. 1C is a perspective view of the tool assembly in FIG. 1A.
Figure 1D:
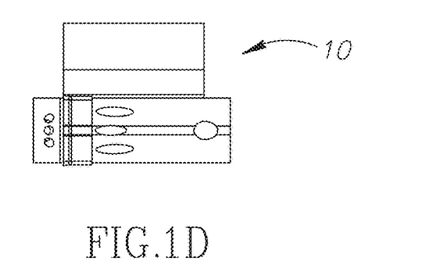
FIG. 1D is a front view of the tool assembly in FIG. 1A.

Referring briefly to FIG. 1A, the head portion 52 can have a thin portion, i.e. a head portion width $W_H$, which is smaller than an insert width $W_C$ portion adjacent the front end. Notably, the insert width $W_C$ is identical to an active cutting edge length, namely the combined length of lateral edge length $L_F$, and the first and second edge lengths $L_{E1}$, $L_{E2}$.

A longitudinal insert pocket length $L_F$, measured in the longitudinal direction is shown in FIG. 3A.

It will be understood that the first main edge portion 36A and the second main edge portion 36B extend further in the respective first and second side directions $D_{S1}$, $D_{S2}$ than the first and second flank tool sides 46, 48 thereby defining a thin portion (which in this case extends the entire length of the head portion 52). As shown in FIG. 1A, it will be understood the thin portion extends for a length measured in the longitudinal direction at least, and even more than, twice as long as a longitudinal insert pocket length $L_{IL}$ (FIG. 3A) of the insert pocket 54.

Figure 4A:
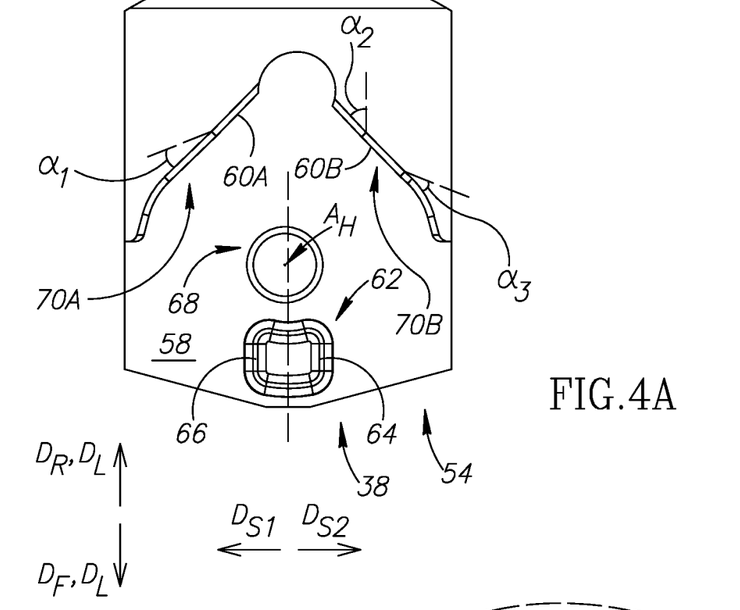
FIG. 4A is an enlarged view of the insert pocket of the tool holder in FIG. 3A.
Figure 4B:
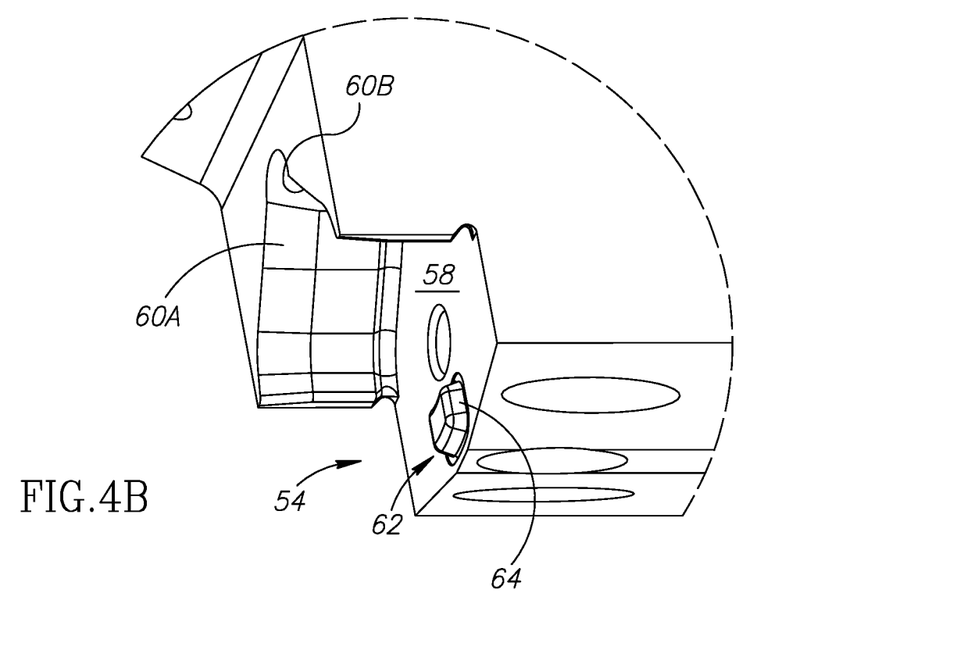
FIG. 4B is an enlarged side perspective view of the insert pocket in FIG. 4A, shown in a similar view to the insert pocket in FIG. 3C.

Referring also to FIGS. 4A and 4B, the insert pocket 54 will be described.

The insert pocket 54 comprises a pocket base surface 58, a first pocket abutment wall 60A extending upwardly from the pocket base surface 58 and which faces both the forward and second side direction $D_F$, $D_{S2}$; and a second pocket abutment wall 60B extending upwardly from the pocket base surface 58 and which faces both the forward and first side directions $D_F$, $D_{S1}$.

The pocket base surface 58 comprises an upwardly projecting protuberance 62 which in turn comprises a flat flank pocket abutment surface 64 at one side thereof and which faces the second sideways direction $D_{S2}$.

To ensure contact of only the pocket flank abutment surface 64 and not to a pocket flank non-abutment surface 66 located on the opposite side of the protuberance 62, a screw hole axis $A_H$ of the screw hole 68 could be offset from the vertical plane $P_V$, as shown. Alternatively, the protuberance can be asymmetric about the vertical plane $P_V$ and extends slightly further in the second sideways direction $D_{S2}$ (not shown). It will be noted there may be other solutions with similar effect. Nonetheless both solutions (which include asymmetry about the vertical plane $P_V$) allow the recesses 26 in the insert 12 to be made symmetrically.

Alternatively, the insert pocket 54 can be symmetric and each recess 26 in the insert's bottom surface 20 could be slightly shorter on one side as long as the insert 12 is rotationally symmetric for each recess 26.

Notably, in FIG. 4A, the desired lateral abutment surfaces (i.e. the first pocket abutment wall 60A, second pocket abutment wall 60B and flank pocket abutment surface 64; noting that this statement does not refer to the pocket base surface 58 which provides no lateral support) of the insert pocket 54 are each at different distances, measurable along the longitudinal direction $D_L$, from the front end 38. While the first and second pocket abutment walls 60A, 60B may, in some embodiments, overlap partially in distance from the front end 38, the term "different distances" means that they do not have identical extensions in the longitudinal direction $D_L$. Stated differently, one of the first and second pocket abutment walls 60A, 60B can begin or ends further from the front end 38 than the other.

The flank pocket abutment surface 64 is the closest to the tool holder's front end 38.

The first pocket abutment wall 60A is furthest from the front end and is located further in the first sideways direction than the others.

The second pocket abutment wall 60B is, measurable along the longitudinal direction $D_L$, located between the flank pocket abutment surface 64 and the first pocket abutment wall 60A, and is located further in the second sideways direction than the others.

It will be understood that regardless of which sideways direction the tool assembly machines a workpiece, the same abutment surfaces are always in contact with the insert 12.

Namely, the first insert flank sub-surface 30A abuts the second pocket abutment wall 60B, the second insert flank sub-surface 30B abuts the first pocket abutment wall 60A, the flank insert abutment surface 28 abuts the flank pocket abutment surface 64; and the insert's bottom surface 20 abuts the pocket base surface 58.

However, the force distribution on the various abutment locations varies according to the direction of machining.

Accordingly, when the tool assembly machines with the cutting insert 14, relatively speaking, moving in the second sideways direction $D_{S2}$ (said movement being relative to the workpiece—it will be understood the workpiece could be moving in the second sideways direction $D_{S2}$ with the insert 14 being stationary, but having the same forces applied thereof as the insert moving in the first sideways direction $D_{S1}$ and the workpiece being stationary) there are large forces applied on the flank pocket abutment surface 64. Whereas in the opposite machining direction, the first sideways direction $D_{S1}$, there are far less forces applied on the flank pocket abutment surface 64 and significantly more are applied on the second pocket abutment wall 60B. The different distances from the front end 38 of the tool holder help prevent the insert from rotating in the insert pocket.

While the rear portion of the insert pocket appears symmetrical in FIG. 3A, upon closer review of the enlarged insert pocket in FIG. 4A, it is noted this is not the case.

Notably, for constructional strength purposes, the first pocket abutment wall 60A is part of a larger first wall 70A, and the second pocket abutment wall 60B is part of a larger second wall 70B.

To ensure contact at the designated abutment portions, the larger first and second walls 70A, 70B are relieved from the first and second pocket abutment walls 60A, 60B. Such angles being artificially exaggerated for the purpose of understanding only and shown schematically as first second and third relief angles $\alpha 1$, $\alpha 2$ and $\alpha 3$.

Referring to the other example tool assembly 10' shown in FIGS. 5A to 7D, an alternative abutment arrangement is shown. Corresponding elements have the same numeral as those described above with the addition of an apostrophe (').

The high-feed tool assembly 10' comprising a three-way indexable insert 12', a tool holder 14' and a screw 16' securing the insert 12' to the tool holder 14'.

Figure 5A:
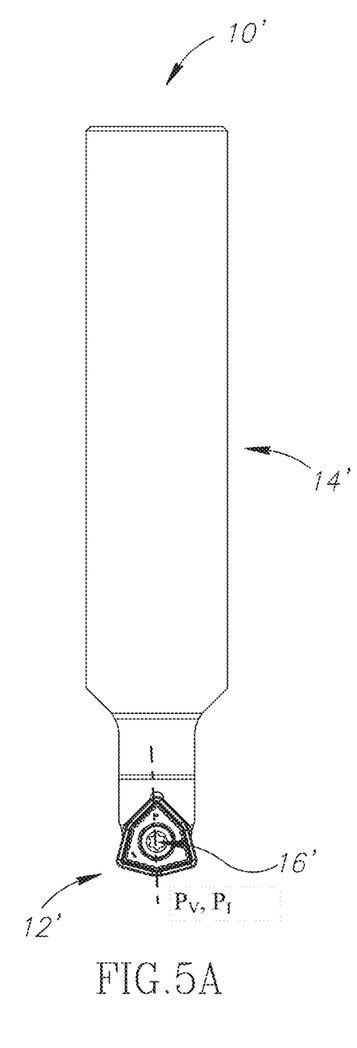
FIG. 5A is a top view of another example high-feed tool assembly according to the subject matter of the present application.
Figure 5B:
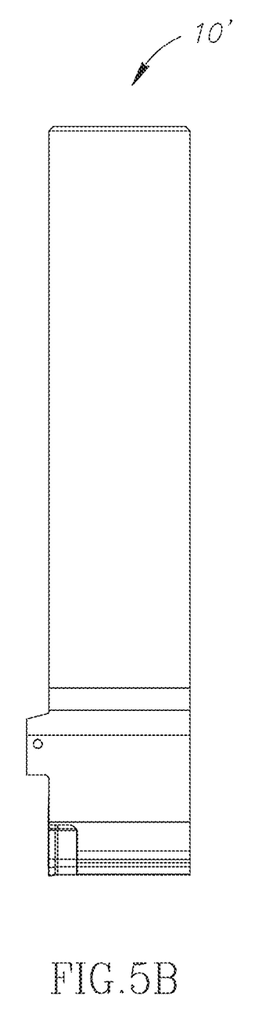
FIG. 5B is a side view of the tool assembly in FIG. 5A.
Figure 5C:
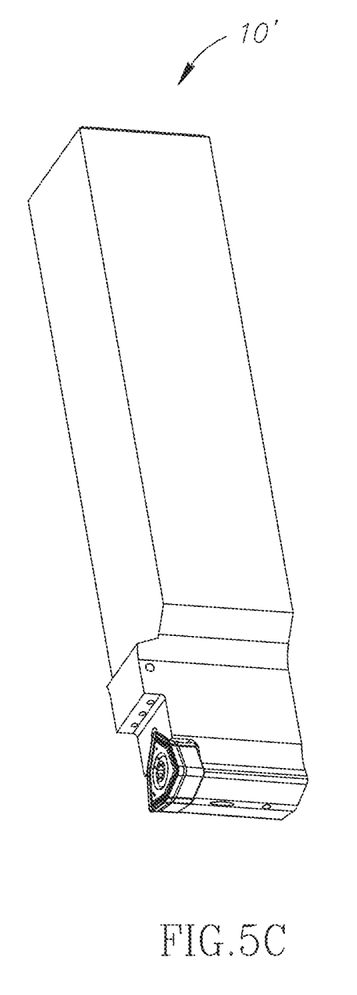
FIG. 5C is a perspective view of the tool assembly in FIG. 5A.
Figure 5D:
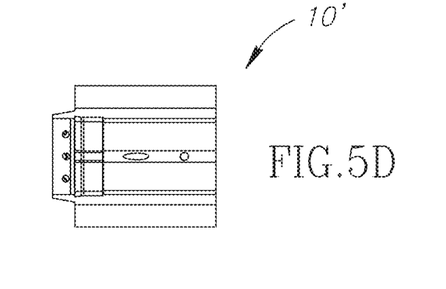
FIG. 5D is a front view of the tool assembly in FIG. 5A.

Only the differences of significance are noted. While it is clear that there is a different shank portion 50', the main difference is the insert mounting arrangement (noting that even the previously described insert mounting arrangement could be used with this shank portion 50' or vice versa).

Figure 7A:
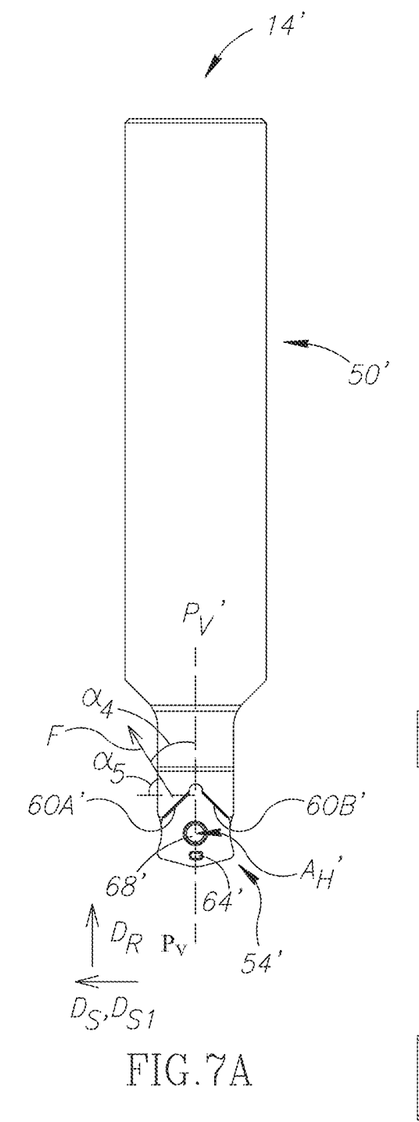
FIG. 7A is a top view of the tool holder in FIG. 5A.
Figure 7B:
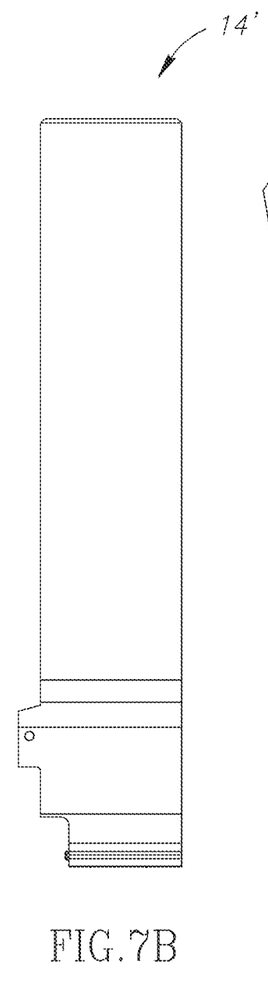
FIG. 7B is a side view of the tool holder in FIG. 7A.
Figure 7C:
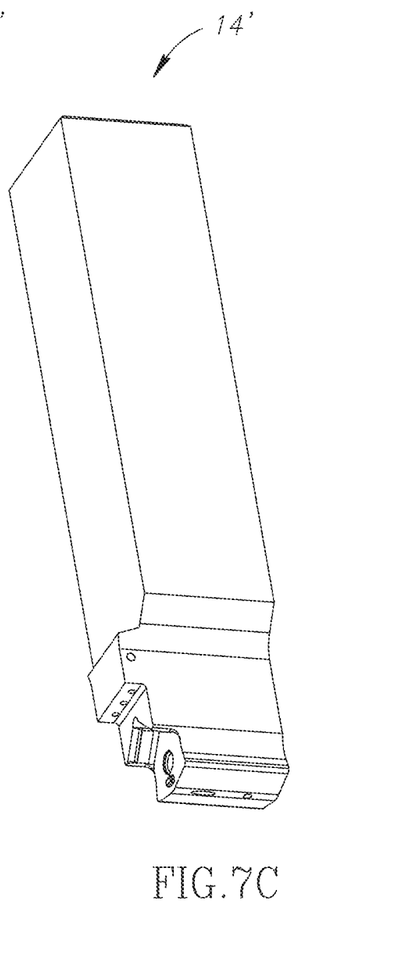
FIG. 7C is a perspective view of the tool holder in FIG. 7A.
Figure 7D:
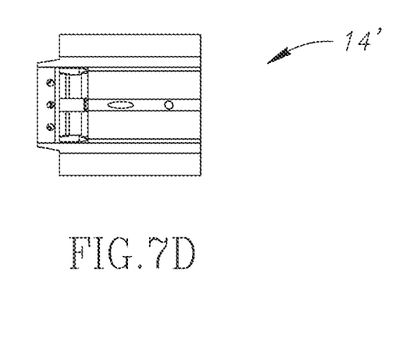
FIG. 7D is a front view of the tool holder in FIG. 7A.

Specifically, in tool holder 10', the first and second pocket abutment walls 60A', 60B' are symmetrical about the vertical plane $P_V'$.

To ensure an asymmetric force arrangement, the insert's screw hole 74 (FIG. 6A) is non-circular. More precisely, it is provided with three linear screw hole abutment surfaces, namely first, second and third screw hole abutment surfaces 72A, 72B, 72C, one for each of the three indexable positions. Meanwhile, the insert pocket hole 68' (FIG. 7A) has a hole axis $A_H'$ which is offset relative to the insert axis $A_I'$. As a consequence, a biasing force F is created, providing a similar asymmetric force distribution effect to the previous example which used differently located first and second pocket abutment walls.

Figure 6A:
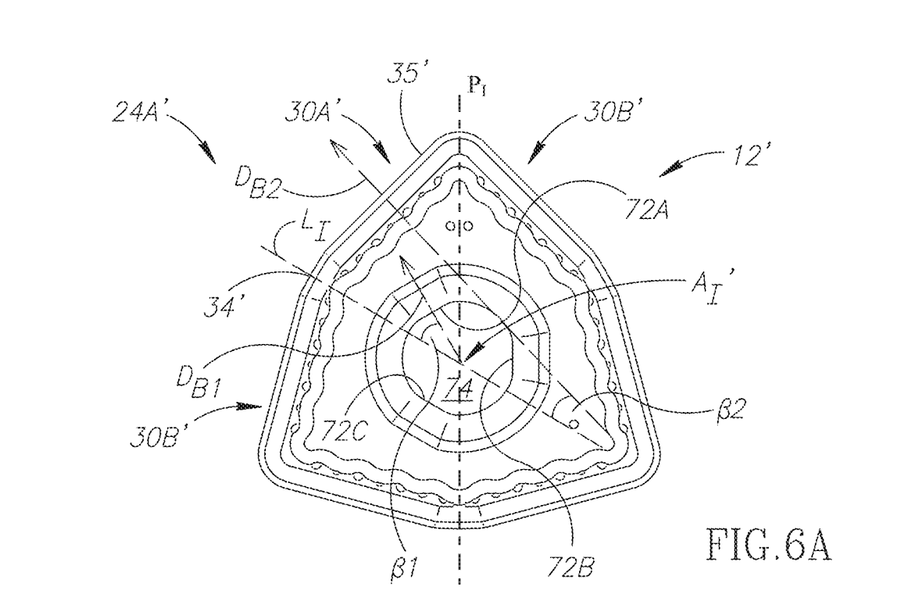
FIG. 6A is a top view of the insert in FIG. 5A.
Figure 6B:
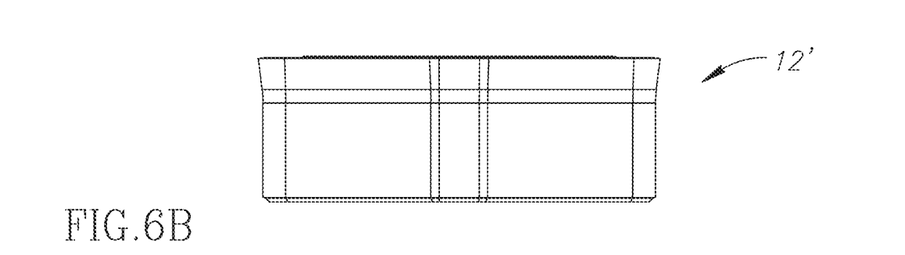
FIG. 6B is a side view of the insert in FIG. 6A.
Figure 6C:
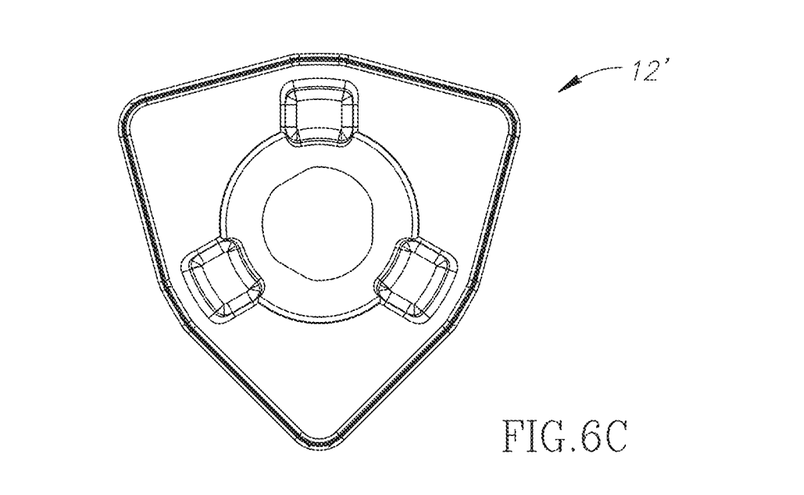
FIG. 6C is a bottom view of the insert in FIG. 6A.

The biasing force F is in the rearward direction $D_R$ and (in this optional example) first sideways direction $DS_1$.

More precisely, the biasing force F is more towards the rearward direction $D_R$ than towards the first sideways direction $D_{S1}$. In other words, a first biasing angle $\alpha 4$ formed between the direction of the biasing force F and the vertical plane $P_V$ in the rearward direction $D_R$ is smaller than a second biasing angle $\alpha 5$ formed between the direction of the force F and the sideways direction $D_S$. It should be understood that the arrows and angles in the drawings are schematic and not intended for measurement.

This can also be understood from the insert 14' alone, in which the first screw hole abutment surface 72A is not parallel with the insert flank abutment sub-surface adjacent thereto (in this example the first insert flank sub-surface 30A') but is slanted relative thereto.

To describe the slant in a more geometric manner, a first normal direction $D_{B1}$ to the screw hole abutment surface 72A is not parallel with a second normal direction $D_{B2}$ to the first abutment sub-surface 30A'. Stated differently, an imaginary line LI extending from the center of the insert 12' (i.e. through the insert axis $A_I'$) and the center of the first active cutting edge 24A', can form a first acute angle $\beta 1$ with said first normal direction $D_{B1}$ to the screw hole abutment surface 72A, and the imaginary line LI can form a second acute angle $\beta 2$ with said second normal direction $D_{B2}$ of the first abutment sub-surface 30A'. The first acute angle $\beta 1$ being larger than the second acute angle $\beta 2$. Stated yet differently again, the second normal direction $D_{B2}$ can be directed more towards the forwardmost edge portion 34' than the first normal direction $D_{B1}$.

Reverting to FIG. 1B, although in common with both embodiments, the forwardmost edge portion 34 is located forward of the front tool end 38, and is located further in the forward direction than the remainder of the active cutting edge, which in this example is the first active cutting edge 24A. The forwardmost edge portion 34 also intersects the vertical bisector plane $P_V$ as best shown in FIG. 1A. In the turning tool assembly, the insert vertical plane $P_I$ is aligned with the vertical bisector plane $P_V$.

As best shown in FIG. 1A, the first main edge portion 36A extends further in the first side direction than the first flank tool side 46 adjacent the front tool end, and the second main edge portion 36B extends further in the second side direction than the second flank tool side 48 adjacent the front tool end. Thus, the insert 12 (or insert 12') is shown immersed in the workpiece to a depth that would not be possible in the above-described prior art design and can even extend fully within the workpiece 25. While this is a significant advantage, at the present time even a high feed tool holder 12 or tool assembly 10 configured for machining in two opposite sideways directions is not even known, even without such significant advantage (which is therefore an additional benefit to the present invention).

What is claimed is:

1. A two-directional high-feed turning tool assembly comprising:
   a tool holder, a cutting insert, and a clamping element;
   the tool holder comprising:
   opposite front and rear tool ends defining a longitudinal direction including a forward direction ($D_F$) towards the front tool end and a rearward direction opposite thereto;

opposite upper and lower tool sides defining a vertical direction including an upward direction towards the upper tool side and a downward direction opposite thereto;

opposite first and second flank tool sides defining a sideways direction including a first side direction towards the first flank tool side and a second side direction opposite thereto;

a vertical bisector plane ($P_V$) extending parallel to the longitudinal and vertical directions, and bisecting the first and second flank tool sides adjacent to the front tool end;

a shank portion;

a head portion extending from the shank portion; and an insert pocket formed at an intersection of the front tool end and upper tool side of the head portion, the insert pocket comprising a pocket base surface;

the cutting insert is secured to the insert pocket via the clamping element;

the cutting insert comprising:

opposite top and bottom surfaces, and an insert flank surface connecting the top and bottom surfaces; and a peripheral cutting edge formed along at least a portion of an intersection of the insert flank surface and the top surface, the peripheral cutting edge comprising at least one active cutting edge;

the active cutting edge comprising:

a forwardmost edge portion located forward of the front tool end, extending further in the forward direction than the remainder of the active cutting edge, and having a lateral edge length measurable parallel to the sideways direction;

a first main edge portion extending from the forwardmost edge in both the first side and rearward directions to a location further in the first side direction than the first flank tool side adjacent the front tool end, the first main edge portion having a first edge length measurable parallel to the sideways direction and a first edge depth measurable parallel to the longitudinal direction;

a second main edge portion extending from the forwardmost edge in both the second side and rearward directions to a location further in the second side direction than the second flank tool side adjacent the front tool end, the second main edge portion having a second edge length measurable parallel to the sideways direction and a second edge depth measurable parallel to the longitudinal direction;

the first edge length being larger than each of the first edge depth and the lateral edge length; and the second edge length being larger than each of the second edge depth and the lateral edge length;

wherein:

the tool assembly is configured for machining in a forward direction ($D_F$) and also machining in two opposite side directions ($D_{S1}$, $D_{S2}$), both of which side directions are perpendicular to the forward direction ($D_F$).

2. The tool assembly according to claim 1, wherein the first and second main edge portions define first and second immersion angles K1, K2 relative to the sideways direction, fulfilling the condition: $6° \leq K1, K2 \leq 30°$.

3. The tool assembly according to claim 2, wherein the first and second main edge portions define first and second immersion angles K1, K2 and the first and second immersion angles K1, K2 are equal in value.

4. The tool assembly according to claim 1, wherein the cutting insert further comprises a flank insert abutment surface adjacent to the insert bottom surface and the pocket base surface further comprises a flank pocket abutment surface; and the flank insert abutment surface abuts the flank pocket abutment surface.

5. The tool assembly according to claim 4, wherein the flank insert abutment surface is provided on an internal recess in the insert bottom surface and the flank pocket abutment surface is provided on a protuberance formed on the pocket base surface.

6. The tool assembly according to claim 5, wherein said protuberance extends further in one of the first and second sideways directions than in the other of the first and second sideways directions.

7. The tool assembly according to claim 5, wherein the internal recess is shorter on one side in one of the first or second sideways directions.

8. The tool assembly according to claim 4, wherein the flank insert abutment surface is the closest abutment surface of the cutting insert to the active cutting edge.

9. The tool assembly according to claim 1, wherein the forwardmost edge portion is straight in a top view of the cutting insert.

10. The tool assembly according to claim 1, wherein the first and second main edges are straight in a top view thereof.

11. The tool assembly according to claim 1, wherein the first and second main edge portions are equal in length.

12. The tool assembly according to claim 1, wherein each of the first and second main edges are at least twice the length of the forwardmost edge.

13. The tool assembly according to claim 1, wherein the insert pocket further comprises:

a first pocket abutment wall extending upwardly from the pocket base surface and facing both the forward and second flank tool side directions; and a second pocket abutment wall extending upwardly from the pocket base surface and facing both the forward and first flank tool side directions; and the first pocket abutment wall and the second pocket abutment wall both abut the cutting insert's insert flank surface.

14. The tool assembly according to claim 13, wherein, in a top view of the insert pocket, the first pocket abutment wall and the second pocket abutment wall, where they abut the cutting insert, are asymmetric relative to the vertical bisector plane.

15. The tool assembly according to claim 1, wherein:

the insert flank surface further comprises:

a first insert flank sub-surface which faces both the rearward and second flank tool side directions; and a second insert flank sub-surface which faces both the rearward and first flank tool side directions;

the insert's bottom surface further comprises: a flank insert abutment surface which faces the first flank tool side direction;

the insert pocket further comprises:

a first pocket abutment wall extending upwardly from the pocket base surface and facing both the forward and second flank tool side directions; and a second pocket abutment wall extending upwardly from the pocket base surface and facing both the forward and first flank tool side directions;

the pocket base surface further comprises a flank pocket abutment surface facing the second flank tool side direction, the flank pocket abutment surface is located closer to the front tool end than the first and second pocket abutment walls; and wherein the only abutment locations of the insert and insert pocket are:
the first insert flank sub-surface abuts the second pocket abutment wall;
the second insert flank sub-surface abuts the first pocket abutment wall;
the flank insert abutment surface abuts the flank pocket abutment surface; and
the bottom surface abuts the pocket base surface.

16. The tool assembly according to claim 15, wherein: the second insert flank sub-surface abuts the first pocket abutment wall further, in the longitudinal direction, from the front tool end, than where the first insert flank sub-surface abuts the second pocket abutment wall.

17. The tool assembly according to claim 16, wherein: the flank pocket abutment surface and the second pocket abutment wall are on the same side of the vertical bisector plane and the first pocket abutment wall is on the other side of the vertical bisector plane.

18. The tool assembly according to claim 1, wherein the cutting insert is a three-way indexable insert.

19. The tool assembly according to claim 1, wherein the cutting insert is a single-sided insert.

20. The tool assembly according to claim 1, wherein the cutting insert is formed with a non-circular screw hole surface configured to direct a clamping force towards a particular insert flank surface location.

21. The tool assembly according to claim 1, wherein
the first main edge portion and the second main edge portion extend further in the respective first and second side directions than the first and second flank tool sides, thereby defining a thin portion of the head portion; and
the thin portion extends for a length measured in the longitudinal direction at least as long as a longitudinal insert pocket length of the insert pocket which is measured parallel to the longitudinal direction.

22. The tool assembly according to claim 1, wherein the insert bottom surface and the pocket base surface are flat.

23. The tool assembly according to claim 1, wherein the forwardmost edge portion intersects the vertical bisector plane.

24. The tool assembly according to claim 1, wherein:
the cutting insert further has (i) a central insert axis; and (ii) an insert vertical plane ($P_I$) which passes through the insert's top and bottom surfaces, contains the central insert axis and intersects the forwardmost edge portion; and
the insert vertical plane ($P_I$) is aligned with the vertical bisector plane ($P_V$).

25. A two-directional high-feed turning tool assembly comprising:
a tool holder, a cutting insert, and a clamping element;
the tool holder comprising:
opposite front and rear tool ends defining a longitudinal direction including a forward direction towards the front tool end and a rearward direction opposite thereto;
opposite upper and lower tool sides defining a vertical direction including an upward direction towards the upper tool side and a downward direction opposite thereto;
opposite first and second flank tool sides defining a sideways direction including a first side direction towards the first flank tool side and a second side direction opposite thereto;
a vertical bisector plane extending parallel to the longitudinal and vertical directions, and bisecting the first and second flank tool sides adjacent to the front tool end;
a shank portion;
a head portion extending from the shank portion; and
an insert pocket formed at an intersection of the front tool end and upper tool side of the head portion, the insert pocket comprising:
a pocket base surface;
a first pocket abutment wall extending upwardly from the pocket base surface and facing both the forward and second flank tool side directions; and
a second pocket abutment wall extending upwardly from the pocket base surface and facing both the forward and first flank tool side directions;
wherein:
the first pocket abutment wall and the second pocket abutment wall both abut the cutting insert's insert flank surface; and
in a top view of the insert pocket, the first pocket abutment wall and the second pocket abutment wall, where they abut the cutting insert, are asymmetric relative to the vertical bisector plane;
the cutting insert is secured to the insert pocket via the clamping element;
the cutting insert comprising:
opposite top and bottom surfaces, and an insert flank surface connecting the top and bottom surfaces; and
a peripheral cutting edge formed along at least a portion of an intersection of the insert flank surface and the top surface, the peripheral cutting edge comprising at least one active cutting edge;
the active cutting edge comprising:
a forwardmost edge portion located forward of the front tool end, extending further in the forward direction than the remainder of the active cutting edge, and having a lateral edge length measurable parallel to the sideways direction;
a first main edge portion extending from the forwardmost edge in both the first side and rearward directions to a location further in the first side direction than the first flank tool side adjacent the front tool end, the first main edge portion having a first edge length measurable parallel to the sideways direction and a first edge depth measurable parallel to the longitudinal direction;
a second main edge portion extending from the forwardmost edge in both the second side and rearward directions to a location further in the second side direction than the second flank tool side adjacent the front tool end, the second main edge portion having a second edge length measurable parallel to the sideways direction and a second edge depth measurable parallel to the longitudinal direction;
the first edge length being larger than each of the first edge depth and the lateral edge length; and
the second edge length being larger than each of the second edge depth and the lateral edge length.

26. A two-directional high-feed turning tool assembly comprising:
a tool holder, a cutting insert, and a clamping element;
the tool holder comprising:
opposite front and rear tool ends defining a longitudinal direction including a forward direction towards the front tool end and a rearward direction opposite thereto;

opposite upper and lower tool sides defining a vertical direction including an upward direction towards the upper tool side and a downward direction opposite thereto;

opposite first and second flank tool sides defining a sideways direction including a first side direction towards the first flank tool side and a second side direction opposite thereto;

a vertical bisector plane extending parallel to the longitudinal and vertical directions, and bisecting the first and second flank tool sides adjacent to the front tool end;

a shank portion;

a head portion extending from the shank portion; and an insert pocket formed at an intersection of the front tool end and upper tool side of the head portion, the insert pocket comprising:

a pocket base surface comprising a flank pocket abutment surface facing the second flank tool side direction;

a first pocket abutment wall extending upwardly from the pocket base surface and facing both the forward and second flank tool side directions; and a second pocket abutment wall extending upwardly from the pocket base surface and facing both the forward and first flank tool side directions;

wherein the flank pocket abutment surface is located closer to the front tool end than the first and second pocket abutment walls;

the cutting insert is secured to the insert pocket via the clamping element;

the cutting insert comprising:

opposite top and bottom surfaces, and an insert flank surface connecting the top and bottom surfaces, the insert bottom surface comprising:

a flank insert abutment surface which faces the first flank tool side direction;

the insert flank surface comprising:

a first insert flank sub-surface which faces both the rearward and second flank tool side directions; and a second insert flank sub-surface which faces both the rearward and first flank tool side directions; and a peripheral cutting edge formed along at least a portion of an intersection of the insert flank surface and the top surface, the peripheral cutting edge comprising at least one active cutting edge;

the active cutting edge comprising:

a forwardmost edge portion located forward of the front tool end, extending further in the forward direction than the remainder of the active cutting edge, and having a lateral edge length measurable parallel to the sideways direction;

a first main edge portion extending from the forwardmost edge in both the first side and rearward directions to a location further in the first side direction than the first flank tool side adjacent the front tool end, the first main edge portion having a first edge length measurable parallel to the sideways direction and a first edge depth measurable parallel to the longitudinal direction;

a second main edge portion extending from the forwardmost edge in both the second side and rearward directions to a location further in the second side direction than the second flank tool side adjacent the front tool end, the second main edge portion having a second edge length measurable parallel to the sideways direction and a second edge depth measurable parallel to the longitudinal direction;

the first edge length being larger than each of the first edge depth and the lateral edge length; and the second edge length being larger than each of the second edge depth and the lateral edge length;

wherein the only abutment locations of the insert and insert pocket are:

the first insert flank sub-surface abuts the second pocket abutment wall;

the second insert flank sub-surface abuts the first pocket abutment wall;

the flank insert abutment surface abuts the flank pocket abutment surface; and the bottom surface abuts the pocket base surface.

* * * * *